(12) United States Patent
Choi et al.

(10) Patent No.: US 10,104,038 B2
(45) Date of Patent: Oct. 16, 2018

(54) METHOD OF DEFINING INTERFACE IDENTIFIER (IID) OF IPV6 ADDRESS AND A COMMUNICATION DEVICE OPERATING THE SAME

(71) Applicant: Electronics and Telecommunications Research Institute, Daejeon (KR)

(72) Inventors: Young Hwan Choi, Daejeon (KR); Yun Chul Choi, Daejeon (KR); Yong Geun Hong, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 400 days.

(21) Appl. No.: 15/147,030

(22) Filed: May 5, 2016

(65) Prior Publication Data

US 2017/0054679 A1    Feb. 23, 2017

(30) Foreign Application Priority Data

Aug. 18, 2015  (KR) ......................... 10-2015-0116291

(51) Int. Cl.
*G06F 15/16* (2006.01)
*H04L 29/12* (2006.01)

(52) U.S. Cl.
CPC ...... *H04L 61/2007* (2013.01); *H04L 61/6004* (2013.01); *H04L 61/6059* (2013.01)

(58) Field of Classification Search
CPC ............ H04L 61/2007; H04L 61/6004; H04L 61/6059; H04L 61/6068; H04L 61/6072; H04L 61/6081
See application file for complete search history.

(56) References Cited

U.S. PATENT DOCUMENTS

| | | | |
|---|---|---|---|
| 2008/0075083 A1* | 3/2008 | Tremaine | H04L 29/1232 370/392 |
| 2010/0091710 A1 | 4/2010 | Jung et al. | |
| 2013/0235862 A1* | 9/2013 | Kahng | H04L 61/6072 370/338 |
| 2015/0100861 A1 | 4/2015 | Kim et al. | |

FOREIGN PATENT DOCUMENTS

KR    10-0653527    12/2006

* cited by examiner

*Primary Examiner* — Ryan J Jakovac
(74) *Attorney, Agent, or Firm* — Kile Park Reed & Houtteman PLLC

(57) ABSTRACT

Provided is a method of defining an interface identifier (IID) of an Internet Protocol version 6 (IPv6) address and devices operating the same, wherein the method includes defining a first IID and a second IID in an IID based on a predetermined value at a predetermined location in the IID of an IPv6 address, assigning, based on an node identification (ID), a first node ID to the first IID and a second node ID to the second IID; and assigning information on a network connecting condition of a communication device to at least one of a first sub-IID corresponding to an area excluding the first node ID in the first IID and a second sub-IID corresponding to an area excluding the second node ID in the second IID.

20 Claims, 9 Drawing Sheets

DIRECT CONNECTION TO INTERNET

AD-HOC CONNECTION

CONNECTION TO NETWORK

US 10,104,038 B2

METHOD OF DEFINING INTERFACE IDENTIFIER (IID) OF IPV6 ADDRESS AND A COMMUNICATION DEVICE OPERATING THE SAME

CROSS-REFERENCE TO RELATED APPLICATION

This application claims the priority benefit of Korean Patent Application No. 10-2015-0116291, filed on Aug. 18, 2015, at the Korean Intellectual Property Office, the disclosure of which is incorporated herein by reference.

BACKGROUND

1. Field of the Invention

Embodiments relate to a method of defining an interface identifier (IID) of an Internet Protocol version 6 (IPv6) address and devices operating the same.

2. Description of the Related Art

An Internet Protocol version 6 (IPv6) address may include a most significant 64-bit prefix address and an interface identifier (IID) corresponding to a 64-bit area. The IID may be a device identification (ID) used for identification in a local network. The IPv6 address may provide the upper 64-bit prefix for network identification and form a total 128-bit global unique address.

However, in an IPv6 packet transmission method based on a low power device being developed by IETF 6lo WG, a method of generating an IPv6 IID for IPv6 packet transmission based on G.9959, a near field communication (NFC), and Master-slave/Token-passing (MS/TP) network transmission method may simply utilize a link layer address of a device to correspond to a lowest unit.

For example, in a case of the NFC, the front 58 bits of a 64-bit IID area may be filled with all zeroes, and the remaining 6 bits of the area may be appended as an NFC link layer address. The MS/MP and G9959 network may use a least significant 8-bit link layer address of the 64-bit IID.

SUMMARY

Embodiments provide technology for effectively managing a local network by extending a local network effectively using an interface identifier (IID) address area when an Internet Protocol version 6 (IPv6) address is generated.

According to an embodiment, there is provided a method of defining an interface identifier (IID) of an Internet Protocol version 6 (IPv6) address, the method including defining a first IID and a second IID in an IID based on a predetermined value at a predetermined location in the IID of an IPv6 address, assigning, based on a node identification (ID), a first node ID to the first IID and a second node ID to the second IID, and assigning information on a network connecting condition of a communication device to at least one of a first sub-IID corresponding to an area excluding the first node ID in the first IID and a second sub-IID corresponding to an area excluding the second node ID in the second IID.

The node ID may be based on a sum of the first node ID and the second node ID. The assigning of the first node ID and the second node ID based on the node ID may include, when the node ID is an even numbered n-bit, assigning a half of the n-bit to the first node ID and a half of the n-bit to the second node ID.

The assigning of the first node ID and the second node ID based on the node ID may include, when the node ID is an odd numbered n-bit, changing the node ID to an even numbered n+1-bit by adding a binary number to the node ID, assigning a half of the n+1-bit to the first node ID, and assigning a half of the n+1-bit to the second node ID.

The information on the network connecting condition may be expressed as zero or a random number.

The assigning of the information on the network connection condition may include assigning zero to each of the first sub-IID and the second sub-IID when the communication device is directly connectable to the Internet.

The assigning of the information on the network connecting condition may include assigning a random number to each of the first sub-IID and the second sub-IID when the communication device forms an ad-hoc network. The assigning of the information on the network connecting condition may include assigning a random number to each of the first sub-IID and the second sub-IID when the communication device is connected to a neighbor network, wherein the random number assigned to the first sub-IID may be obtained from a terminal device configured to serve as an address management server in the neighbor network. The method may further include transmitting, by the communication device, a request message with respect to the random number assigned to the first sub-IID to the terminal device.

A redundancy check may be performed by comparing the random number assigned to the first sub-IID to address information of terminal devices to prevent address redundancy between the terminal devices in the neighbor network.

According to another embodiment, there is provided a communication device, the device including a communication module, and an address generation device configured to obtain a prefix of an IPv6 address through the communication module and define a first IID and a second IID based on a predetermined value at a predetermined location in an IID of the IPv6 address, wherein, based on a node ID, the address generation device is configured to assign a first node ID to the first IID, assign a second node ID to the second IID, and assign information on a network connecting condition of a communication device to at least one of a first sub-IID corresponding to an area excluding the first node ID in the first IID and a second sub-IID corresponding to an area excluding the second node ID in the second IID.

The node ID may be based on a sum of the first node ID and the second node ID.

When the node ID is an even numbered n-bit, the address generation device may be configured to assign a half of the n-bit to the first node ID and a half of the n-bit to the second node ID.

When the node ID is an odd numbered n-bit, the address generation device may be configured to change the node ID to an even numbered n+1-bit by adding a binary number to the node ID, assign a half of the n+1-bit to the first node ID, and assign a half of the n+1-bit to the second node ID.

The information on the network connecting condition may be expressed as zero or a random number.

The address generation device may be configured to assign zero to each of the first sub-IID and the second sub-IID when the communication device is directly connectable to the Internet.

The address generation device may be configured to assign a random number to each of the first sub-IID and the second sub-IID when the communication device forms an ad-hoc network.

The address generation device may be configured to assign a random number to each of the first sub-IID and the second sub-IID when the communication device is connected to a neighbor network, and the random number assigned to the first sub-IID may be obtained from a terminal device configured to serve as an address management server in the neighbor network.

The address generation device may be configured to transmit a request message with respect to the random number assigned to the first sub-IID to the terminal device through the communication module.

A redundancy check may be performed by comparing the random number assigned to the first sub-IID to address information of terminal devices to prevent address redundancy between the terminal devices in the neighbor network.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
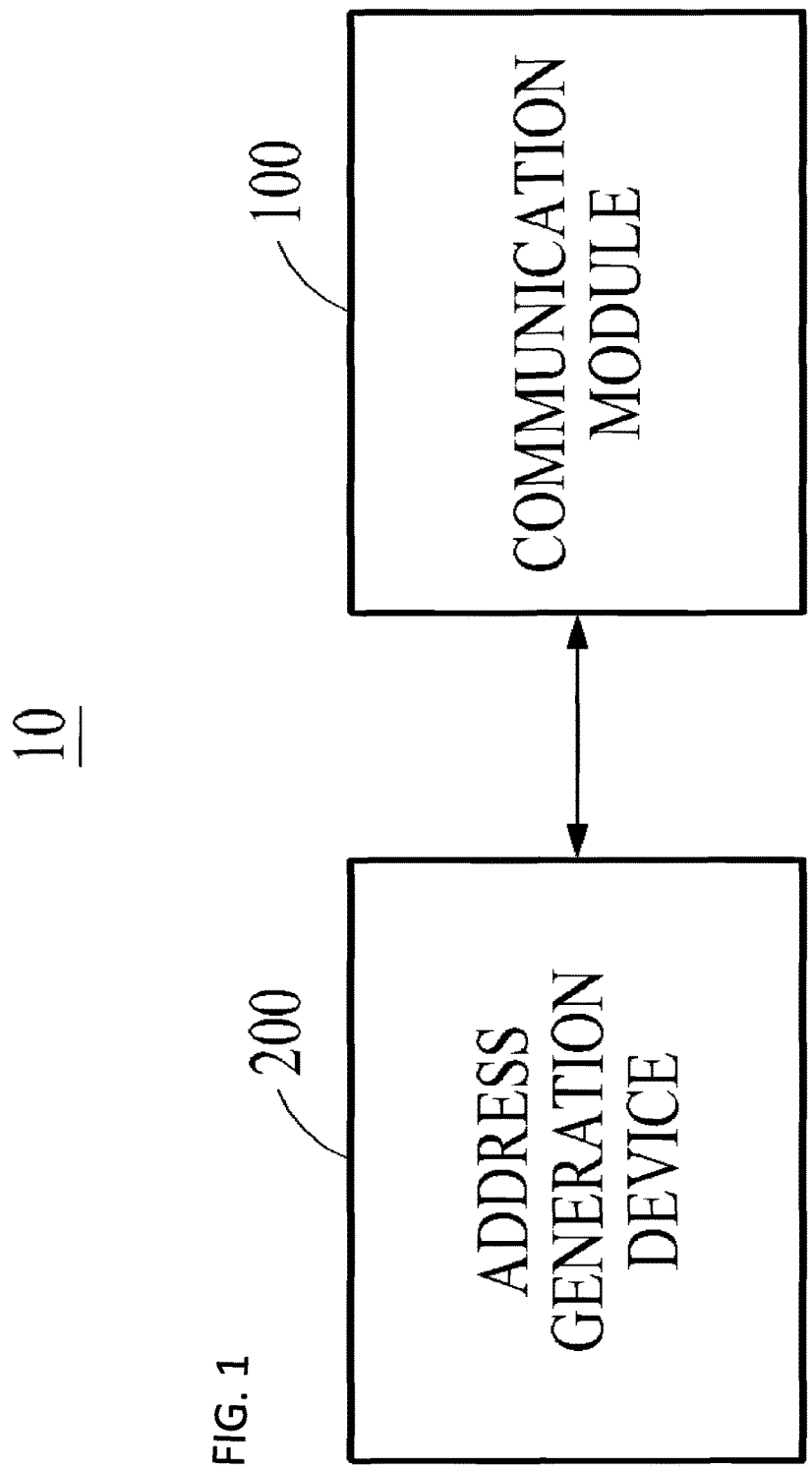
FIG. 1 is a block diagram illustrating a communication device according to an embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Various example embodiments will now be described more fully with reference to the accompanying drawings in which some example embodiments are shown. In the drawings, the thicknesses of layers and regions are exaggerated for clarity.

A term, "module," described herein may refer to hardware that may perform a function and an operation to be described hereinafter according to each name of a module. Alternatively, the term "module" may refer to a computer program code that may execute a function and an operation, or an electronic recording medium, for example, a processor, including the computer program code that may execute a function and an operation.

Thus, the term "module" may refer to hardware to implement technical features of the present invention and/or a functional and/or structural combination of software to execute the hardware. Each module may be referred to as a device.

FIG. 1 is a block diagram illustrating a communication device according to an embodiment.

Referring to FIG. 1, a communication device 10 includes a communication module 100 and an address generation device 200.

The communication device 10 may be a low power wireless communication device. For example, the communication device 10 may be a communication device based on a low power wire-wireless network interface technology such as G.9959, near field communication (NFC), and Master-slave/Token-passing (MS/TP). The communication device 10 may be a constrained device. The communication device 10 may be provided as a personal computer (PC), a data server, or a portable device.

The portable device may be provided in a laptop computer, a cellular phone, a smartphone, a tablet PC, a mobile internet device (MID), a personal digital assistant (PDA), an enterprise digital assistant (EDA), a digital still camera, a digital video camera, a portable multimedia player (PMP), a personal navigation device (PND) or a portable navigation device (PND), a handheld game console, an e-book, or a smart device.

The smart device may be provided in a smartwatch or a smartband. The address generation device 200 may define an interface identifier (IID) of an Internet Protocol version 6 (IPv6) address.

Figure 3:
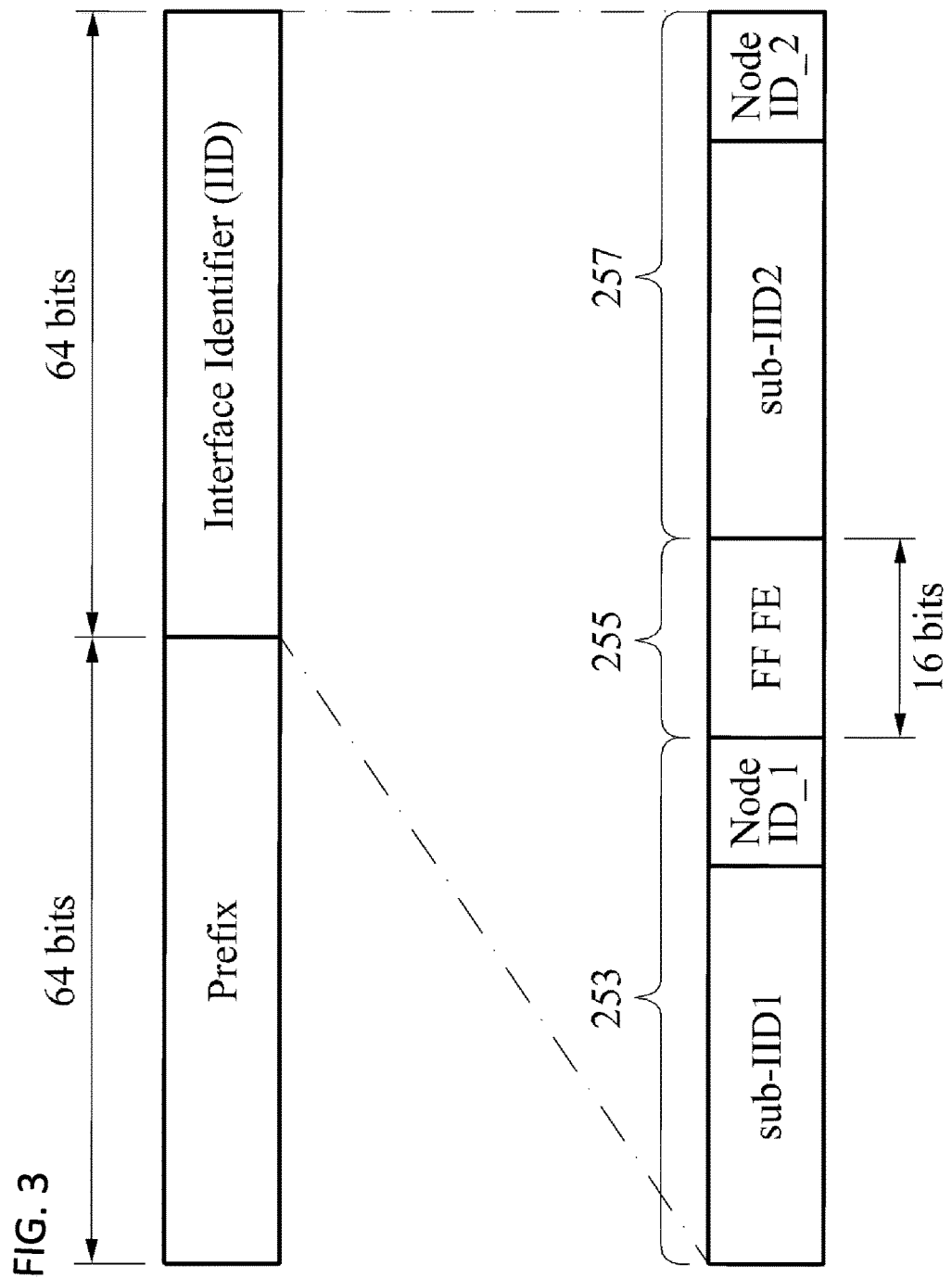
FIG. 3 illustrates an example of defining an interface identifier (IID) in an Internet Protocol version 6 (IPv6) address according to an embodiment.

As illustrated in FIG. 3, the IPv6 address may include an area of a prefix having a 64-bit length and an area of an IID having a remaining 64-bit length. The prefix may be an address value to be identified from a worldwide network, and the IID may be an address value to be identified in a link lock network. Thus, the communication device 10 may generate a global unique address which is globally identifiable by including the prefix and the IID.

Concisely, the prefix may be the address value generated to identify a local network unit and the IID may be the address value generated to identify devices, for example, terminals, in a local network.

The address generation device 200 may obtain, through the communication module 100, the prefix of the IPv6 address from an upper connection device being able to communicate with the communication device 10. The prefix may be an address value given from the upper connection device.

The upper connection device may include a dongle, a base station, and an access point (AP) including a router. For example, the dongle may indicate a universal serial bus (USB) dongle, a Bluetooth dongle, an NFC dongle, a Miracast dongle in addition to all wireless dongles connectable to the Internet. The upper connection device may indicate all devices to provide a network environment for a communication to the communication device 10.

Figure 2:
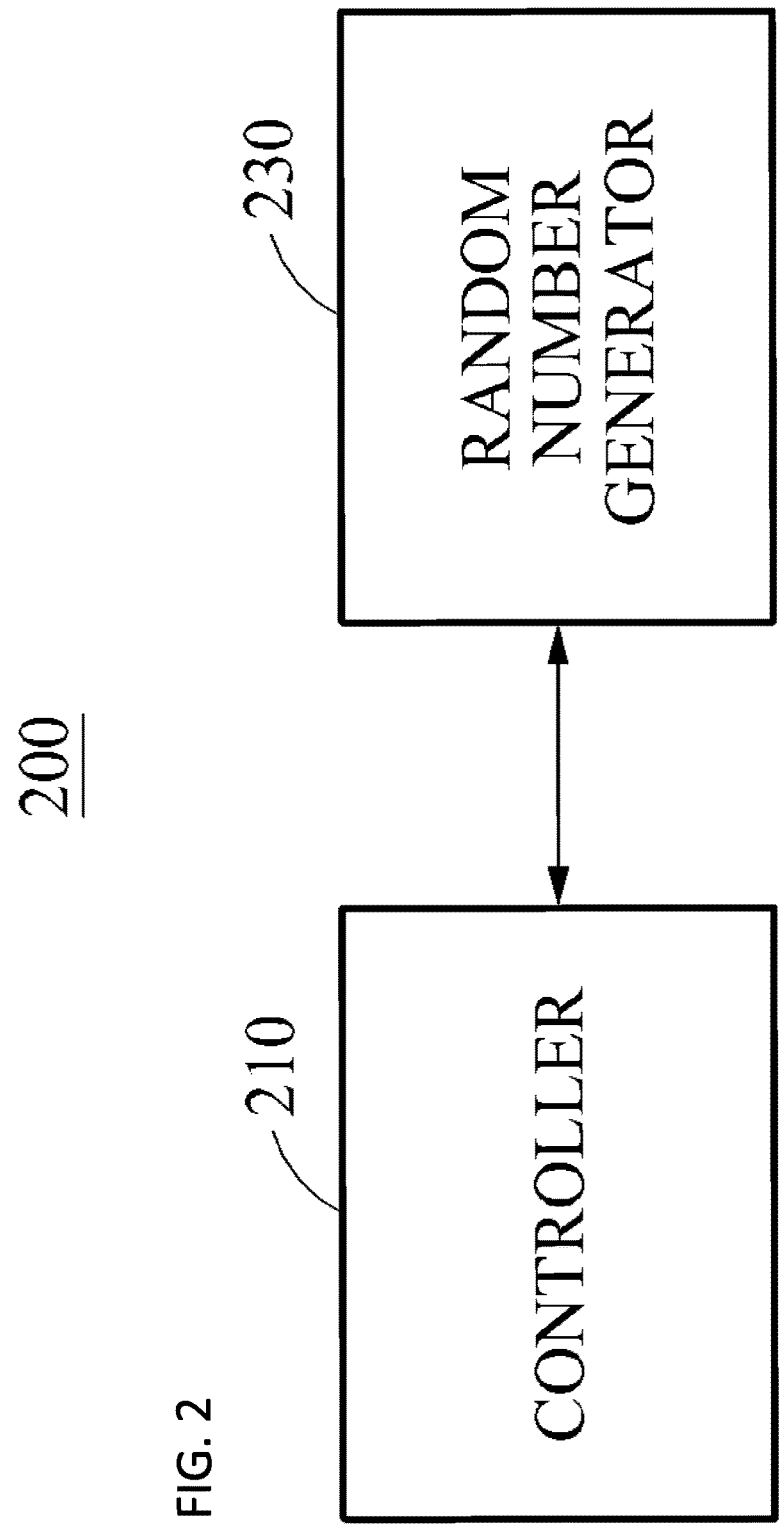
FIG. 2 is a block diagram of an address generation device illustrated in FIG. 1 according to an embodiment.

FIG. 2 is a block diagram of an address generation device illustrated in FIG. 1 according to an embodiment, and FIG. 3 illustrates an example of defining an interface identifier (IID) in an Internet Protocol version 6 (IPv6) address according to an embodiment. Referring to FIGS. 1 through 3, the address generation device 200 includes a controller 210 and a random number generator 230.

The controller 210 may define a first IID 253 and a second IID 257 in an IID based on a predetermined value 255 at a predetermined location in the IID.

Since the IID of the IPv6 is based on a standard of IEEE EUI-64 Identifier, the predetermined value 255 at the predetermined location in the IID may be "FFFE(16)". "FFFE (16)" may be 16 bits from a middle portion of a 64-bit area of the IID.

Concisely, the first IID 253 and the second IID 257 may be formed based on the predetermined value 255 at the predetermined location in the IID, and each of the first IID 253 and the second IID 257 is a 24-bit area.

The controller 210 may assign, based on the Node ID, a Node ID_1 to the first IID 253 and a Node ID_2 to the second IID 257. Hereinafter, the Node ID_1 refers to a first node ID, the Node ID_2 refers to a second node ID, and the Node ID refers to a node ID. The Node ID may indicate link layer address of the communication device 10. For example, the Node ID may indicate a device ID, for example, a link local identifier of a lower physical layer, of the communication device 10.

Hereinafter, the Node ID is assumed to be an n-bit for ease of description. In an example, when the n is an even number, the controller 210 may divide the even numbered n-bit in half to assign a first half of an n/2-bit to the Node ID_1 and the other half of the n/2-bit to the Node ID_2.

In another example, when the n is an odd number, the controller 210 may change the Node ID to an even numbered bit of n=n+1 by adding a binary number 0(2) to the Node ID, and divide the even numbered n-bit in half to assign the first half of the n/2-bit to the Node ID_1 and the other half of the n/2-bit to the Node ID_2.

Concisely, the Node ID may be based on a sum of the Node ID_1 and the Node ID_2. The controller 210 may assign information on a network connecting condition to at least one of a sub-IID 1 corresponding to an area excluding the Node ID_1 in the first IID 253 and a sub-IID 2 corresponding to an area excluding the Node ID_2 in the second IID 257. Hereinafter, the sub-IID 1 refers to a first sub-IID, and the sub-IID 2 refers to a second sub-IID.

For example, when the n is less than 47, the controller 210 may form a 24-n/2-bit of the sub-IID 1 and a 24-n/2-bit of the sub-IID 2 in the first IID 253 and the second IID 257, respectively. Concisely, the sub-IID 1 and the sub-IID 2 may be variable length address areas.

The random number generator 230 may generate zero or a random number according to a control of the controller 210. The information on the network connecting condition may be expressed as zero or a random number.

The controller 210 may assign, based on the network connecting condition, the zero or the random number generated through the random number generator 230 to at least one of the sub-IID 1 and the sub-IID 2.

The controller 210 may generate the IID by assigning the zero or the random number generated through the random number generator 230 to at least one of the sub-IID 1 and the sub-IID 2 so that the communication device 10 may avoid redundancy between IIDs of a plurality of electronic devices.

That is, the sub-IID 1 and the sub-IID 2 are filled by random numbers of (24-n/2) bits. The aforementioned method of defining the IID may be applied to a node ID obtained from two layers of an open systems interconnection (OSI) seven layers, for example, all low power wire-wireless transmitting technologies of which a length of a lower physical layer address is less than or equal to 48 bits. Thus, in terms of an IPv6 transmitting method based on a low power wire-wireless network, application services allowing a large number of terminal devices to participate may be made possible by effectively utilizing an IID area based on the aforementioned method of defining and generating the IID.

Figure 4A:
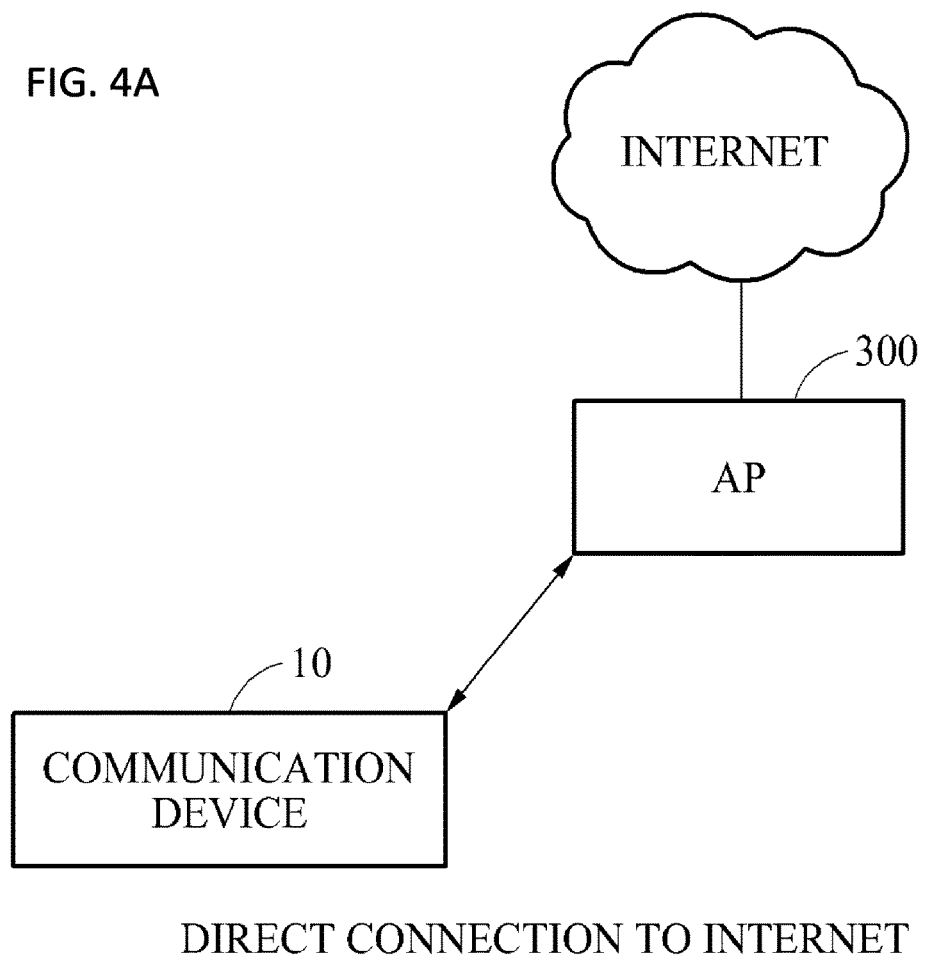
FIGS. 4A through 4C are flowcharts illustrating an example of a method of assigning information on a network connecting condition according to an embodiment.
Figure 4B:
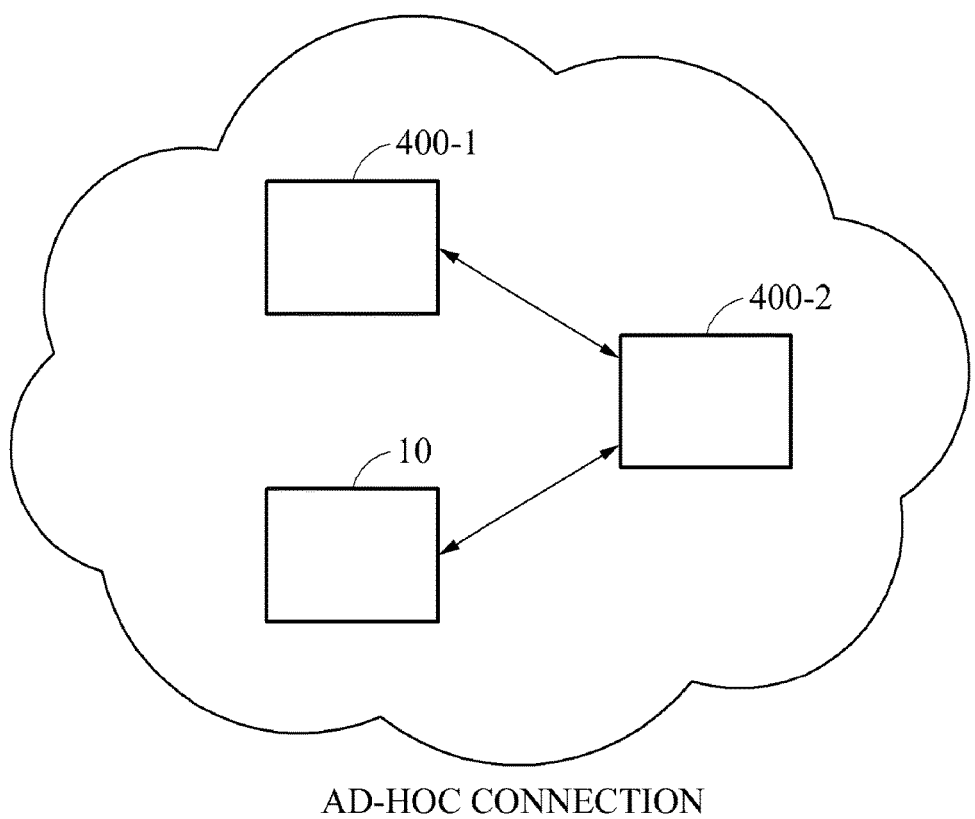
Figure 4C:
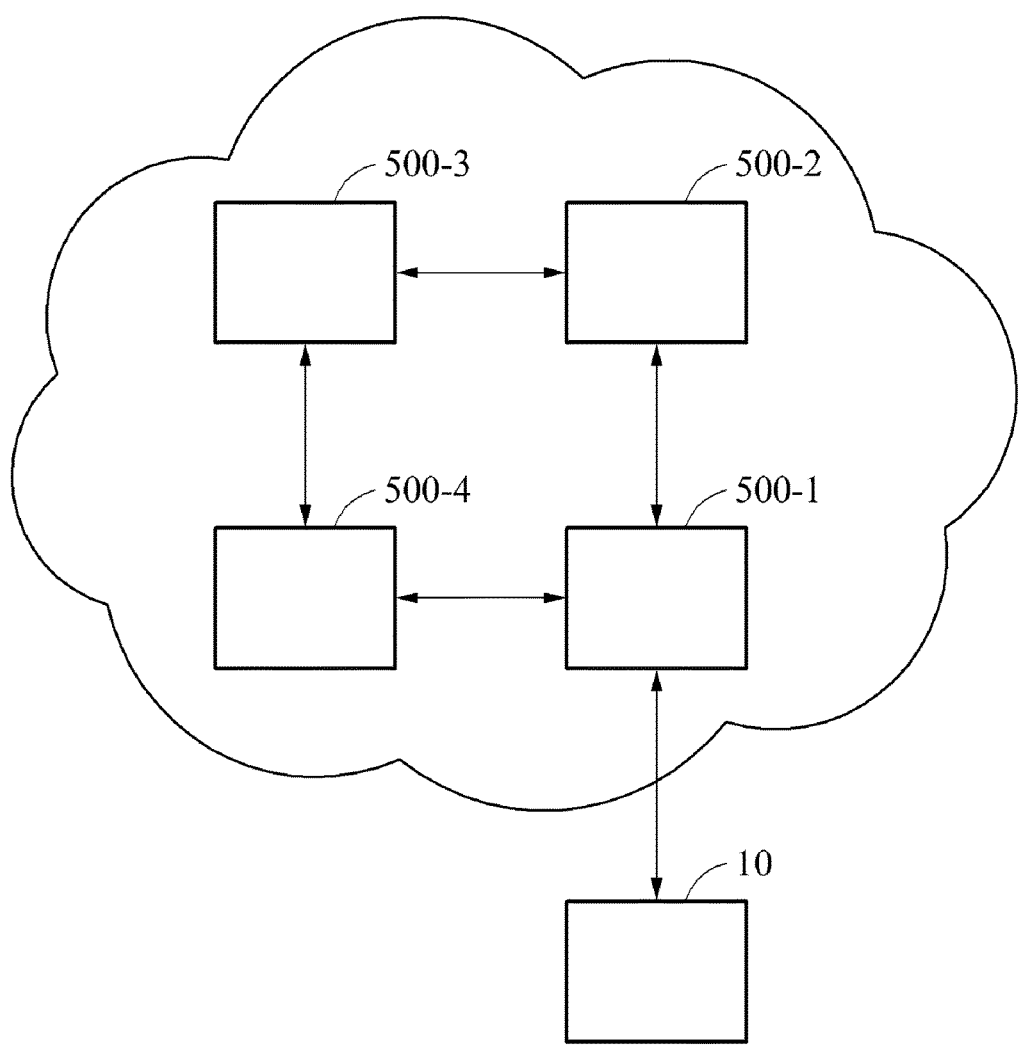

FIGS. 4A through 4C are flowcharts illustrating an example of a method of assigning information on a network connecting condition according to an embodiment. Referring to FIGS. 4A through 4C, the communication device 10 may assign information on a network connecting condition to a sub-IID 1 and a sub-IID 2 as shown in Equation 1.

$$(sub\text{-}IID, sub\text{-}IID2) = \begin{cases} (0, 0) & \text{if} \begin{pmatrix} \text{When communication device is} \\ \text{directly connected to internet} \end{pmatrix} \\ (x_R, y_R) & \begin{pmatrix} \text{When communication device is not} \\ \text{connected to neighbor terminal} \end{pmatrix} \\ (x_{NS}, y_{NS}) & \begin{pmatrix} \text{When communication device is} \\ \text{connected to neighbor terminal} \end{pmatrix} \end{cases} \quad [\text{Equation 1}]$$

The communication device 10 may form a network, for example, a low power wire-wireless network.

As illustrated in FIG. 4A, the communication device 10 may be directly connected to an access point (AP) 300 and thereby connected to the Internet. The AP 300 may be a default access router. In this example, the communication device 10 may generate a unique IPv6 when a prefix value is obtained from the AP 300 so that the communication device 10 may not need to additionally assign a value to the sub-IID 1 and the sub-IID 2. Thus, the communication device 10 may assign 0 to the sub-IID 1 and 0 to the sub-IID2.

As illustrated in FIG. 4B, the communication device 10 and terminal devices 400-1 and 400-2 may configure a network based on an ad-hoc connection. Each of the communication device 10 and the terminal devices 400-1 and 400-2 may not be connected to a neighbor terminal device of another network. Repeated descriptions will be omitted for increased clarity and conciseness because the descriptions of the communication device 10 provided with reference to FIGS. 1 through 3 are also applicable to the terminal devices 400-1 and 400-2.

Each of the communication device 10 and the terminal devices 400-1 and 400-2 may generate a random number before network connection to guarantee uniqueness between devices in an ad-hoc network, and assign $X_R$ to the sub-IID 1 and $Y_R$ to the sub-IID 2.

As illustrated in FIG. 4C, the communication device 10 may be connected to a terminal device 500-1 to connect a neighbor network. The terminal device 500-1 and terminal devices 500-1, 500-2, and 500-3 may form a neighbor network. The descriptions of the communication device 10 provided with reference to FIGS. 1 through 3 are applicable to the terminal devices 500-1 through 500-4. At least one terminal device of the terminal devices 500-1 through 500-4 may serve as an address management server having address information of terminal devices in a network.

The communication device 10 may need to prevent address redundancy between the terminal devices 500-1 through 500-4 when the communication device 10 is connected to the terminal device 500-1 and additionally included in the neighbor network. The communication device 10 may assign $X_{NS}$ to the sub-IID 1 and $Y_R$ to the sub-IID 2. A value XNS assigned to the sub-IID 1 of the communication device 10 may be obtained from a terminal device to serve the address management server among the terminal devices 500-1 through 500-4 in the neighbor network.

Figure 5:
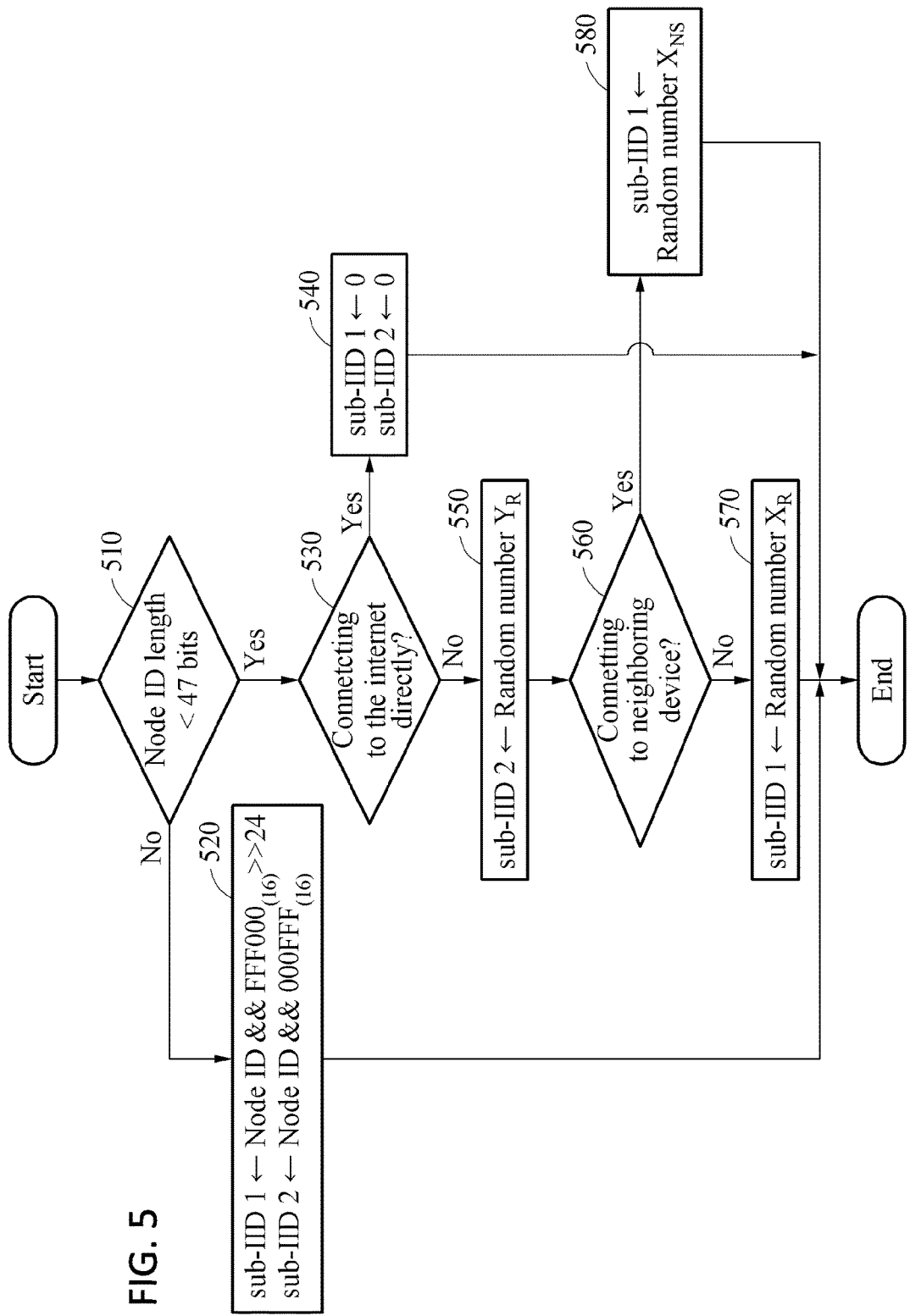
FIG. 5 is a flowchart illustrating an example of a method of generating a value assigned to a first sub-IID and a second sub-IID of a communication device according to an embodiment.

FIG. 5 is a flowchart illustrating an example of a method of generating a value assigned to a first sub-IID and a second sub-IID of a communication device according to an embodiment.

Referring to FIG. 5, in operation 510, the communication device 10 verifies that a length of a Node ID is less than 47 bits. Here, the Node ID corresponds to a node ID.

In operation 520, when the length of the Node ID is greater than or equal to 47 bits, the communication device 10 may assign the first IID 253 including an area of the sub-IID 1 as the Node ID_1, and assign the second IID 257 including the sub-IID 2 as the Node ID_2. In detail, the communication device 10 may assign Node ID && FFF000$_{(16)}$>>24 obtained by performing && operation on most significant 24 bits of the Node ID to the sub-IID 1, and assign Node ID && 000FFF$_{(16)}$ obtained by performing && operation on least significant 24 bits of the Node ID to the sub-IID 2 in operation 520

In operation 530, when the length of the Node ID is less than 47 bits, the communication device 10 verifies whether the communication device 10 is directly connectable to the Internet.

In operation 540, when the communication device 10 is directly connectable to the Internet, the communication device 10 assigns a value 0 to the sub-IID 1 and the value 0 to the sub-IID 2.

In operation 550, when the communication device 10 is not directly connectable to the Internet, the communication device 10 assigns a random number value $Y_R$ to the sub-IID 2.

In operation 560, the communication device 10 verifies whether the communication device 10 is connectable to a neighbor terminal device of a terminal device connected to the communication device 10. Concisely, the communication device 10 may verify whether the communication device 10 is connectable to a neighbor network.

In operation 570, when the communication device 10 is not connectable to the neighbor terminal device, the communication device 10 assigns a random number value $X_R$ to the sub-IID 1. For example, the communication device 10 may form an ad-hoc network with a terminal device.

In operation 580, when the communication device 10 is connectable to the neighbor terminal device of the terminal device, the communication device 10 requests the sub-IID 1 number to neighboring device. For example, the communication device 10 obtains a random number value $X_{NS}$ from the neighbor network including the terminal device and the neighbor terminal device and assigns the random number value $X_{NS}$ to the sub-IID 1.

Figure 6:
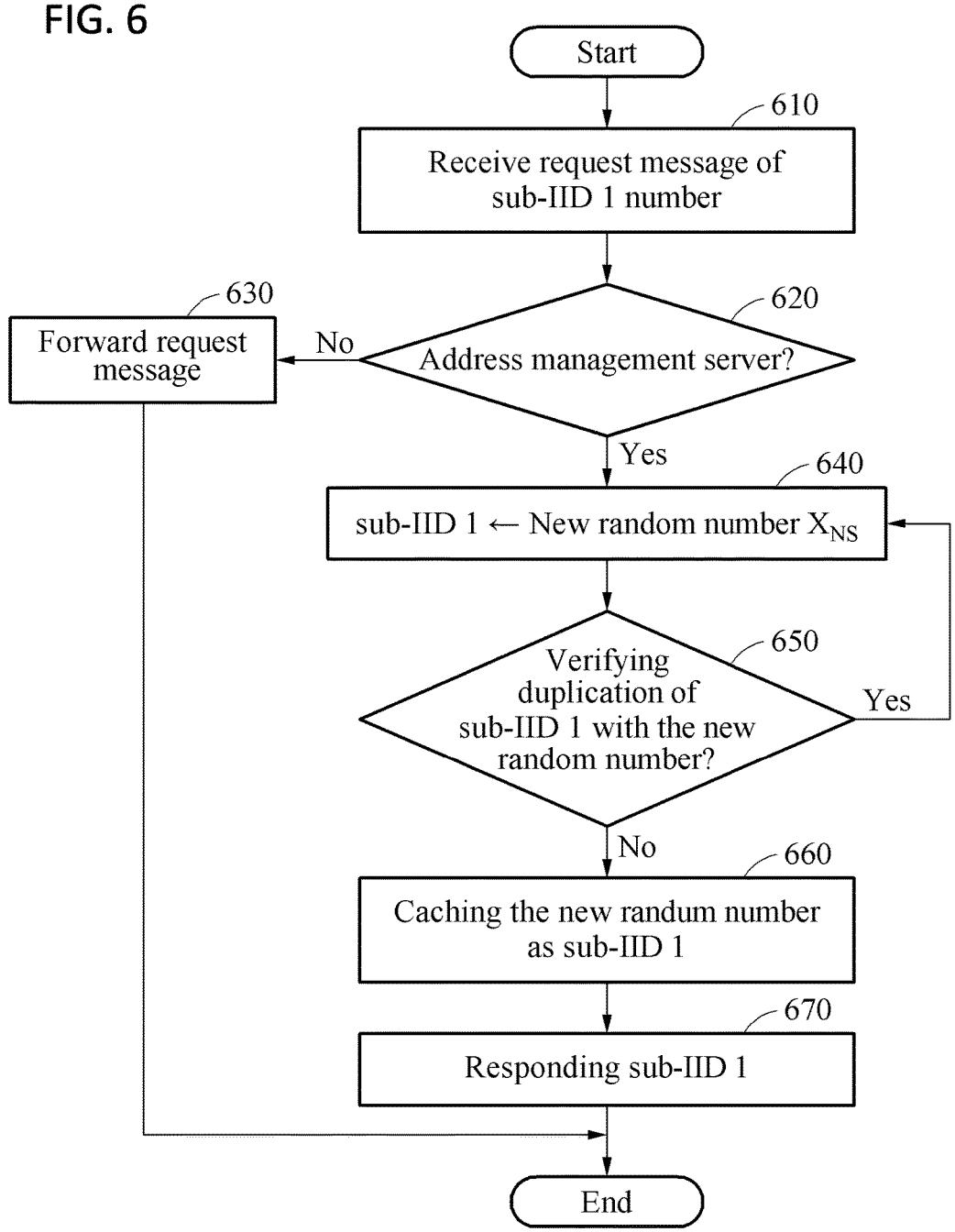
FIG. 6 is a flowchart illustrating an example of a method of preventing an address redundancy in a network condition illustrated in FIG. 4C according to an embodiment.

FIG. 6 is a flowchart illustrating an example of a method of preventing an address redundancy in a network condition illustrated in FIG. 4C according to an embodiment.

Referring to FIGS. 4C and 6, the communication device 10 may transmit a request message with respect to the random number value $X_{NS}$ to the neighbor network to obtain the random number value $X_{NS}$ from the neighbor network including the terminal device 500-1 connected to the communication device 10 and the terminal devices 500-2 through 500-4 neighboring the communication device 10.

The communication device 10 may need to prevent address redundancy between the terminal devices 500-1 through 500-4 when the communication device 10 is connected to the terminal device 500-1 and additionally included in the neighbor network.

Any one terminal device of the terminal devices 500-1 through 500-4 may serve as an address management server having address information of terminal devices in a network.

In operation 610, each of the terminal devices 500-1 through 500-4 receives the request message with respect to sub-IID 1 number (or a value of the sub-IID 1), for example, the random number $X_{NS}$, from the communication device 10.

In operation 620, each of the terminal devices 500-1 through 500-4 verifies that each of the terminal devices 500-1 through 500-4 is the address management server.

In operation 630, when each of the terminal devices 500-1 through 500-4 is not the address management server, each of the terminal devices 500-1 through 500-4 forwards(or routes) the request message with respect to sub-IID 1, for example, the random number value $X_{NS}$ to a terminal device serving as the address management server in the network.

In operation 640, when each of the terminal devices 500-1 through 500-4 is the address management server, each of the terminal devices 500-1 through 500-4 generate a new random number, for example, the random number $X_{NS}$.

In operation 650, each of the terminal devices 500-1 through 500-4 verify duplication of sub-IID 1 with the new random number. For example, each of the terminal devices 500-1 through 500-4 performs a redundancy check by comparing the random number value $X_{NS}$ to address information of neighbor terminal devices in the network in operation 650.

When the random number value $X_{NS}$ is not redundant, each of the terminal devices 500-1 through 500-4 cashes the random number value $X_{NS}$ as the sub-IID 1 and stores the random number value $X_{NS}$ to a cache memory of each of the terminal devices 500-1 through 500-4 in operation 660, and transmits the random number value $X_{NS}$ to the communication device 10 in operation 670.

When the random number value $X_{NS}$ is redundant, each of the terminal devices 500-1 through 500-4 may iteratively perform operation 640 and operation 650.

Figure 7:
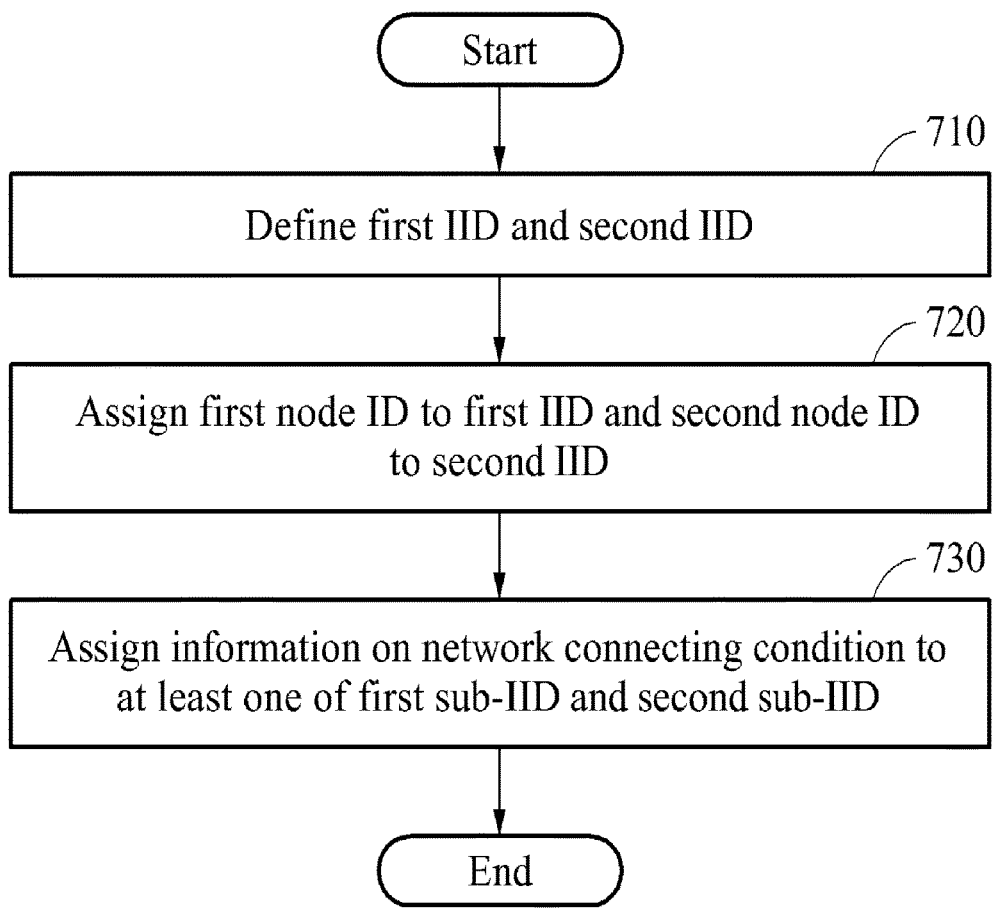
FIG. 7 is a flowchart illustrating an example of an operating method of a communication device illustrated in FIG. 1 according to an embodiment.

FIG. 7 is a flowchart illustrating an example of an operating method of a communication device illustrated in FIG. 1 according to an embodiment.

Referring to FIG. 7, in operation 710, the communication device 10 defines the first IID 253 and the second IID 257 in the IID based on the predetermined value 255 at the predetermined location in the IID of the IPv6 address.

In operation 720, the communication device 10 assigns, based on the Node ID, the Node ID_1 to the first IID 253 and the Node ID_2 to the second IID 257.

In operation 730, the communication device 10 assigns the information on the network connecting condition of the communication device 10 to at least one of the sub-IID 1 corresponding to the area excluding the Node ID_1 in the first IID 253 and the sub-IID 2 corresponding to the area excluding the Node ID_2 in the second IID 257.

The various modules, elements, and methods described above may be implemented using one or more hardware components, one or more software components, or a combination of one or more hardware components and one or more software components.

A hardware component may be, for example, a physical device that physically performs one or more operations, but is not limited thereto. Examples of hardware components include resistors, capacitors, inductors, power supplies, frequency generators, operational amplifiers, power amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Functional programs, codes, and code segments for implementing the examples disclosed herein can be easily constructed by a programmer skilled in the art to which the examples pertain based on the drawings and their corresponding descriptions as provided herein.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of defining an interface identifier (IID) of an Internet Protocol version 6 (IPv6) address, the method comprising:
   defining a first IID and a second IID in an IID based on a predetermined value at a predetermined location in the IID of an IPv6 address;
   assigning, based on an node identification (ID), a first node ID to the first IID and a second node ID to the second IID; and
   assigning information on a network connecting condition of a communication device to at least one of a first sub-IID corresponding to an area excluding the first node ID in the first IID and a second sub-IID corresponding to an area excluding the second node ID in the second IID.

2. The method of claim 1, wherein the node ID is based on a sum of the first node ID and the second node ID.

3. The method of claim 1, wherein the assigning of the first node ID and the second node ID based on the node ID comprises,
   when the node ID is an even numbered n-bit, assigning a half of the n-bit to the first node ID and a half of the n-bit to the second node ID.

4. The method of claim 1, wherein the assigning of the first node ID and the second node ID based on the node ID comprises,
   when the node ID is an odd numbered n-bit, changing the node ID to an even numbered n+1-bit by adding a binary number to the node ID, assigning a half of the n+1-bit to the first node ID, and assigning a half of the n+1-bit to the second node ID.

5. The method of claim 1, wherein the information on the network connecting condition is expressed as zero or a random number.

6. The method of claim 1, wherein the assigning of the information on the network connection condition comprises,
   assigning zero to each of the first sub-IID and the second sub-IID when the communication device is directly connectable to the Internet.

7. The method of claim 1, wherein the assigning of the information on the network connecting condition comprises,
   assigning a random number to each of the first sub-IID and the second sub-IID when the communication device forms an ad-hoc network.

8. The method of claim 1, wherein the assigning of the information on the network connecting condition comprises,
   assigning a random number to each of the first sub-IID and the second sub-IID when the communication device is connected to a neighbor network,
   wherein the random number assigned to the first sub-IID is obtained from a terminal device configured to serve as an address management server in the neighbor network.

9. The method of claim 8, further comprising:
   transmitting, by the communication device, a request message with respect to the random number assigned to the first sub-IID to the terminal device.

10. The method of claim 8, wherein a redundancy check is performed by comparing the random number assigned to the first sub-IID to address information of terminal devices to prevent address redundancy between the terminal devices in the neighbor network.

11. A communication device comprising:
    a communication module; and
    an address generation device configured to obtain a prefix of an IPv6 address through the communication module and define a first IID and a second IID based on a predetermined value at a predetermined location in an IID of the IPv6 address,
    wherein, based on a node ID, the address generation device is configured to assign a first node ID to the first IID, assign a second node ID to the second IID, and assign information on a network connecting condition of a communication device to at least one of a first sub-IID corresponding to an area excluding the first node ID in the first IID and a second sub-IID corresponding to an area excluding the second node ID in the second IID.

12. The device of claim 11, wherein the node ID is based on a sum of the first node ID and the second node ID.

13. The device of claim 11, wherein when the node ID is an even numbered n-bit, the address generation device is configured to assign a half of the n-bit to the first node ID and a half of the n-bit to the second node ID.

14. The device of claim 11, wherein when the node ID is an odd numbered n-bit, the address generation device is configured to change the node ID to an even numbered n+1-bit by adding a binary number to the node ID, assign a half of the n+1-bit to the first node ID, and assign a half of the n+1-bit to the second node ID.

15. The device of claim 11, wherein the information on the network connecting condition is expressed as zero or a random number.

16. The device of claim 11, wherein the address generation device is configured to assign zero to each of the first sub-IID and the second sub-IID when the communication device is directly connectable to the Internet.

17. The device of claim 11, wherein the address generation device is configured to assign a random number to each of the first sub-IID and the second sub-IID when the communication device forms an ad-hoc network.

18. The device of claim 11, wherein the address generation device is configured to assign a random number to each of the first sub-IID and the second sub-IID when the communication device is connected to a neighbor network, and the random number assigned to the first sub-IID is obtained from a terminal device configured to serve as an address management server in the neighbor network.

19. The device of claim 18, wherein the address generation device is configured to transmit a request message with respect to the random number assigned to the first sub-IID to the terminal device through the communication module.

20. The device of claim 18, wherein a redundancy check is performed by comparing the random number assigned to the first sub-IID to address information of terminal devices to prevent address redundancy between the terminal devices in the neighbor network.

* * * * *